United States Patent
Lim

(10) Patent No.: US 9,975,505 B2
(45) Date of Patent: May 22, 2018

(54) VEHICLE AND CONTROL METHOD THEREOF

(71) Applicant: HYUNDAI MOTOR COMPANY, Seoul (KR)

(72) Inventor: Kyu Hyung Lim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 199 days.

(21) Appl. No.: 14/954,794

(22) Filed: Nov. 30, 2015

(65) Prior Publication Data

US 2017/0021785 A1 Jan. 26, 2017

(30) Foreign Application Priority Data

Jul. 22, 2015 (KR) ........................ 10-2015-0103518

(51) Int. Cl.
| | |
|---|---|
| *B60R 16/037* | (2006.01) |
| *G10L 15/20* | (2006.01) |
| *G01C 21/36* | (2006.01) |
| *G10L 15/22* | (2006.01) |
| *G10L 21/0208* | (2013.01) |

(52) U.S. Cl.
CPC ...... *B60R 16/0373* (2013.01); *G01C 21/3608* (2013.01); *G10L 15/20* (2013.01); *G10L 21/0208* (2013.01); *G10L 2015/223* (2013.01); *G10L 2015/228* (2013.01)

(58) Field of Classification Search
None
See application file for complete search history.

(56) References Cited

U.S. PATENT DOCUMENTS

2013/0035934 A1* 2/2013 Nongpiur ............ G10L 21/0208
704/226

FOREIGN PATENT DOCUMENTS

| JP | 2004-240131 A | 8/2004 |
|---|---|---|
| JP | 2005-017709 A | 1/2005 |
| JP | 2005-122042 A | 5/2005 |
| JP | 2006-067690 A | 3/2006 |
| KR | 10-2008-0012475 A | 2/2008 |
| KR | 10-0810275 B1 | 3/2008 |
| KR | 10-2012-0051552 A | 5/2012 |

OTHER PUBLICATIONS

Notice of Allowance dated Jan. 2, 2017, issued in corresponding Korean Patent Application No. 10-2015-0103518 with English language translation.

* cited by examiner

*Primary Examiner* — Shelley Chen
(74) *Attorney, Agent, or Firm* — McDermott Will & Emery LLP

(57) ABSTRACT

A vehicle includes: an input unit configured to receive an execution command for speech recognition; a calculator configured to calculate a time in which the vehicle is expected to arrive at an obstacle existing on a road on which the vehicle travels; and a speech recognition controller configured to compare the calculated time in which the vehicle is expected to arrive at the obstacle to a time in which a voice command input is expected to be completed to determine whether to perform dynamic noise removal pre-processing.

12 Claims, 10 Drawing Sheets

VEHICLE AND CONTROL METHOD THEREOF

CROSS-REFERENCE TO RELATED APPLICATION

This application claims the benefit of priority to Korean Patent Application No. 10-2015-0103518, filed on Jul. 22, 2015 in the Korean Intellectual Property Office, the disclosure of which is incorporated herein by reference.

TECHNICAL FIELD

Embodiments of the present disclosure relate to a vehicle including a speech recognition module, and a control method thereof.

BACKGROUND

Many vehicles include an Audio Video Navigation (AVN) terminal. Generally, the AVN terminal displays a control screen for controlling various devices installed in the vehicle or a screen for executing additional functions that can be executed on the AVN terminal, in addition to providing information about a route to a destination. A user can manipulate the AVN terminal through a display with a touch screen or a jog shuttle type controller, or using a voice command to control various devices in the vehicle. In the case in which the user manipulates the AVN terminal using a voice command, the vehicle should be able to recognize voice commands during traveling. Accordingly, research for improving a recognition rate of voice commands when a vehicle travels has been conducted.

SUMMARY

Additional aspects of the disclosure will be set forth in part in the description which follows and, in part, will be obvious from the description, or may be learned by practice of the disclosure.

In accordance with one aspect of the present disclosure, a vehicle includes: an input unit configured to receive an execution command for speech recognition; a calculator configured to calculate a time in which the vehicle is expected to arrive at an obstacle existing on a road on which the vehicle travels; and a speech recognition controller configured to compare the calculated time in which the vehicle is expected to arrive at the obstacle to a time in which a voice command input is expected to be completed to determine whether to perform dynamic noise removal pre-processing.

The vehicle may further include a speed sensor configured to detect a driving speed of the vehicle, and to provide information about the driving speed of the vehicle.

The calculator may calculate the time in which the vehicle is expected to arrive at the obstacle existing on the road on which the vehicle travels, based on information about the obstacle existing on the road on which the vehicle travels, received from a navigation module, and information about the driving speed of the vehicle, received from the speed sensor.

The calculator may calculate the time in which the vehicle is expected to arrive at the obstacle existing on the road on which the vehicle travels, based on the information about the obstacle existing on the road on which the vehicle travels, sensed through a vision sensor, and information about the driving speed of the vehicle, received from the speed sensor.

The speech recognition controller may compare the calculated time in which the vehicle is expected to arrive at the obstacle to a time in which a voice command input is expected to be completed, and activate the dynamic noise removal pre-processing, if the speech recognition controller determines that the vehicle arrives at the obstacle before the voice command input is expected to be completed.

The vehicle may further include an impact sensor configured to determine whether an impact is generated due to the obstacle existing on the road on which the vehicle travels.

If the speech recognition controller determines that the vehicle arrives at the obstacle within the time in which the voice command input is expected to be completed, the speech recognition controller may determine whether an impact is generated due to the obstacle, through the impact sensor, and determines whether to activate the dynamic noise removal pre-processing based on the result of the determination.

In accordance with another aspect of the present disclosure, a vehicle includes: an input unit configured to receive an execution command for speech recognition; a navigation module configured to transfer information about an obstacle existing on a road on which the vehicle travels to a speech recognition controller; and the speech recognition controller configured to compare a time in which the vehicle is excepted to arrive at the obstacle based on the information transferred from the navigation module to a time in which a voice command is input to determine whether to perform dynamic noise removal pre-processing.

The vehicle may further include a speed sensor configured to detect a driving speed of the vehicle, and to provide information about the driving speed of the vehicle.

The speech recognition controller may calculate the time in which the vehicle is expected to arrive at the obstacle existing on the road on which the vehicle travels, based on information about the obstacle existing on the road on which the vehicle travels, received from the navigation module, and information about the driving speed of the vehicle, received from the speed sensor.

The speech recognition controller may calculate the time at which the vehicle is expected to arrive at the obstacle existing on the road on which the vehicle travels, based on the information about the obstacle existing on the road on which the vehicle travels, sensed through a vision sensor, and information about the driving speed of the vehicle, received from the speed sensor.

The speech recognition controller may compare the time in which the vehicle is expected to arrive at the obstacle to a time in which a voice command input is expected to be completed, and activate the dynamic noise removal pre-processing, if the speech recognition controller determines that the vehicle arrives at the obstacle before the voice command input is expected to be completed.

The vehicle may further include an impact sensor configured to determine whether an impact is generated due to the obstacle existing on the road on which the vehicle travels.

If the speech recognition controller determines that the vehicle arrives at the obstacle within the time in which the voice command input is expected to be completed, the speech recognition controller may determine whether an impact is generated due to the obstacle, through the impact sensor, and determine whether to activate the dynamic noise removal pre-processing based on the result of the determination.

The vehicle may further include a controller configured to control the navigation module and the speech recognition controller.

In accordance with still another aspect of the present disclosure, a method of controlling a vehicle includes: activating speech recognition upon receiving an execution command to start speech recognition; calculating a time at which the vehicle is expected to arrive at an obstacle existing on a road on which the vehicle travels; and comparing the calculated time in which the vehicle is expected to arrive at the obstacle to a time in which a voice command input is expected to be completed to determine whether to perform dynamic noise removal pre-processing.

The calculating of the time at which the vehicle is expected to arrive at the obstacle existing on the road on which the vehicle travels may include calculating the time in which the vehicle is expected to arrive at the obstacle existing on the road on which the vehicle travels, based on information about the obstacle existing on the road on which the vehicle travels, received from a navigation module, and information about a driving speed of the vehicle, received from a speed sensor.

The calculating of the time at which the vehicle is expected to arrive at the obstacle existing on the road on which the vehicle travels may include calculating the time at which the vehicle is expected to arrive at the obstacle existing on the road on which the vehicle travels, based on information about the obstacle existing on the road on which the vehicle travels, sensed through a vision sensor, and information about a driving speed of the vehicle, received from the speed sensor.

The determining of whether to perform dynamic noise removal pre-processing may include: upon determination that the calculated time is within the time in which the voice command input is expected to be completed, activating the dynamic noise removal pre-process; and upon determination that the calculated time is greater than the time in which the voice command input is expected to be completed, performing a static noise removal pre-process without activating the dynamic noise removal pre-process.

The determining of whether to perform dynamic noise removal pre-processing may include: upon determination that the vehicle arrives at the obstacle within the time in which the voice command input is expected to be completed, determining whether an impact is generated due to the obstacle, through an impact sensor; upon determination that the impact is generated due to the obstacle, activating the dynamic noise removal pre-processing; and upon determination that the impact is not generated due to the obstacle, performing a static noise removal pre-processing without activating the dynamic noise removal pre-processing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
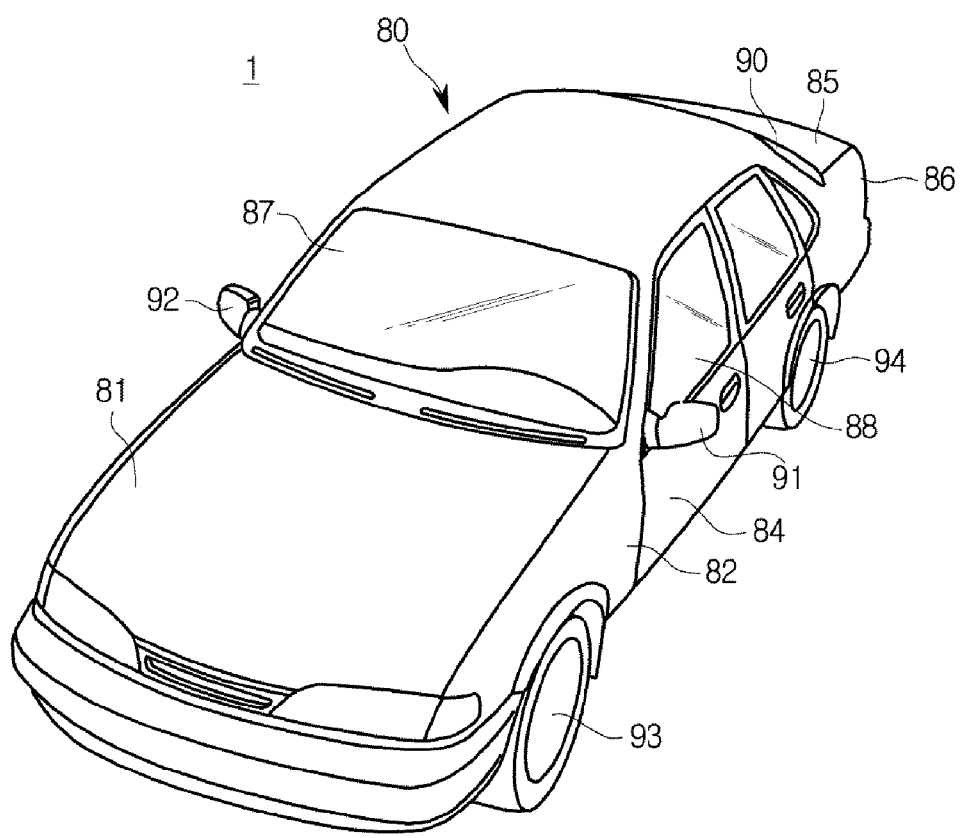
FIG. 1 is a perspective view briefly showing an outer appearance of a vehicle according to an embodiment of the present disclosure.

Reference will now be made in detail to the embodiments of the present disclosure, examples of which are illustrated in the accompanying drawings, wherein like reference numerals refer to like elements throughout.

Hereinafter, embodiments of the present disclosure will be described in detail with reference to the accompanying drawings.

Figure 2:
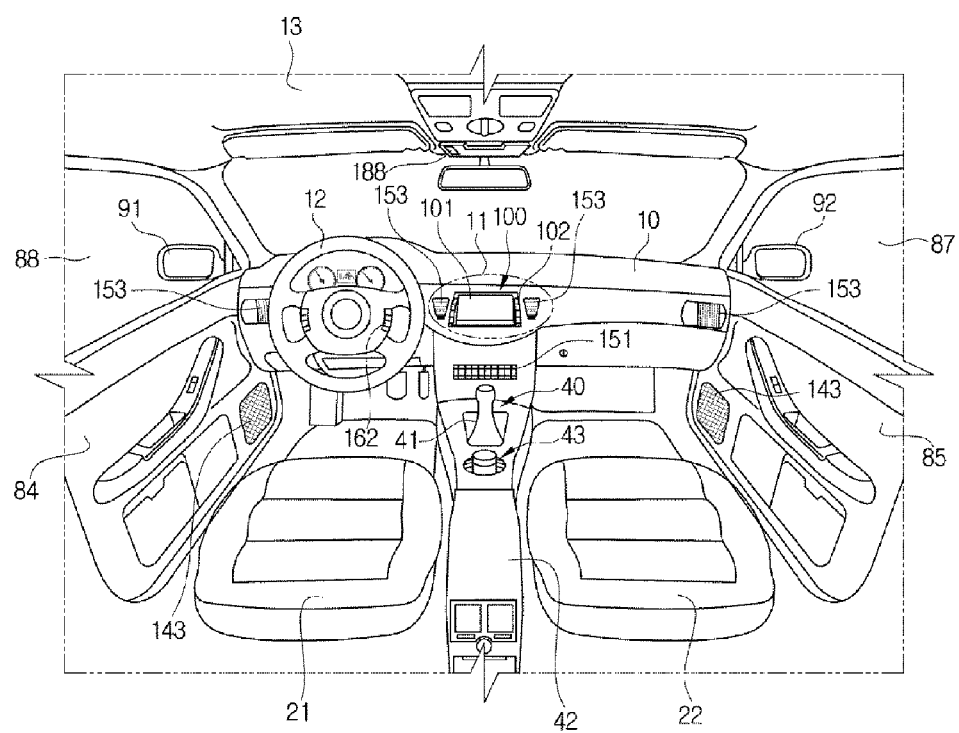
FIG. 2 shows the interior of a vehicle according to an embodiment of the present disclosure.
Figure 3:
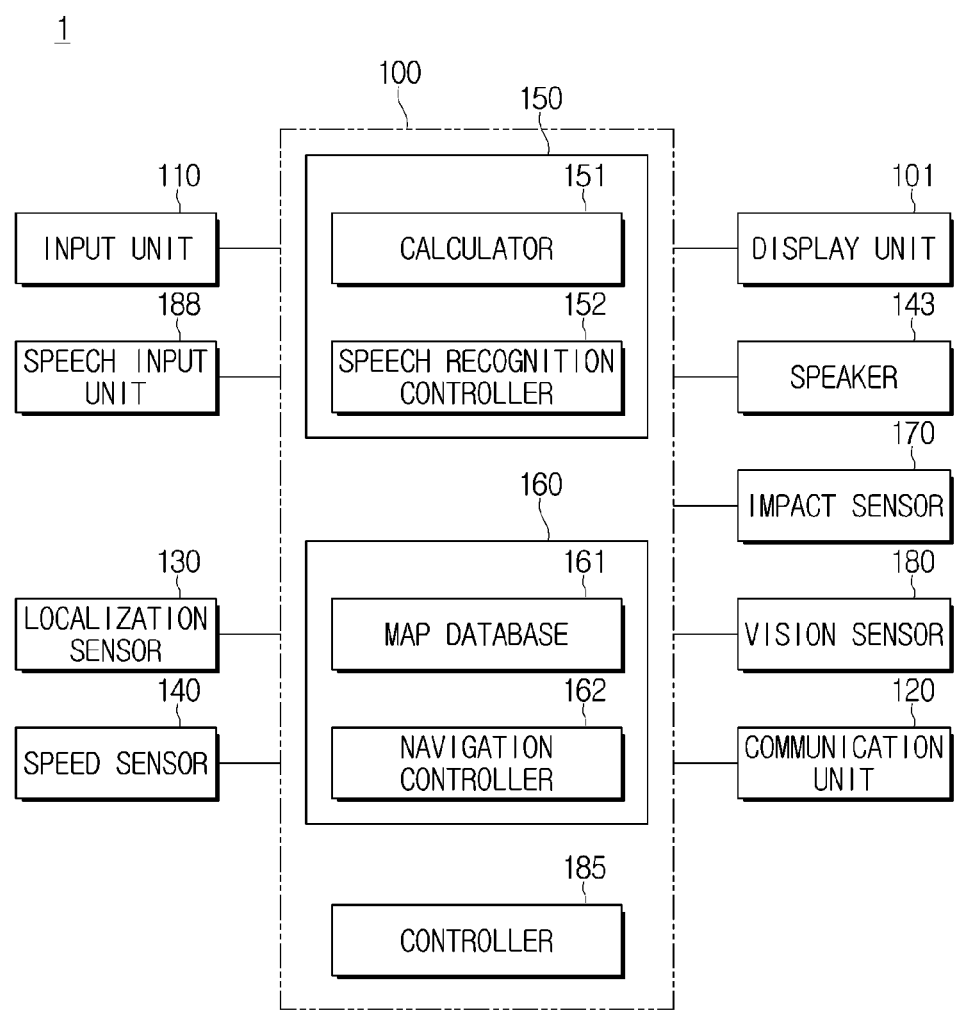
FIGS. 3 and 4 are control block diagrams of vehicles supporting a speech recognition function, according to embodiments of the present disclosure.

FIG. 1 is a perspective view briefly showing an outer appearance of a vehicle according to an embodiment of the present disclosure, FIG. 2 shows the interior of a vehicle according to an embodiment of the present disclosure, and FIG. 3 is a control block diagram of a vehicle that compares information about the direction of a road to information about the direction of the vehicle to determine a driving direction, according to an embodiment of the present disclosure.

Referring to FIG. 1, the vehicle 1 may include a body 80 forming an outer appearance of the vehicle 1, and a plurality of wheels 93 and 94 to move the vehicle 1. The body 80 may include a hood 81, a plurality of front fenders 82, a plurality of doors 84, a trunk lid 85, and a plurality of quarter panels 86.

The body 80 may include a front window 87 installed in the front part of the body 80 to provide a front view of the vehicle 1, a plurality of side windows 88 to provide side views of the vehicle 1, a plurality of side-view mirrors 91 and 92 to provide rear and side views of the vehicle 1, and a rear window 90 installed in the rear part of the body 80 to provide a rear view of the vehicle 1. Hereinafter, the interior of the vehicle 1 will be described in detail.

The vehicle 1 may include an air conditioner. The air conditioner is equipment to control air-conditioned environments including indoor/outdoor environmental conditions of the vehicle 1, air intake/exhaust, air circulation, and air-conditioned states, automatically or according to a user's control command. For example, the vehicle 1 may include an air conditioner that can perform both heating and cooling to discharge heated or cooled air through air vents 153 to thus control the inside temperature of the vehicle 1.

Meanwhile, in the interior of the vehicle 1, an Audio/Video/Navigation (AVN) terminal 100 may be provided. The AVN terminal 100 is a terminal capable of providing audio and video functions, in addition to a navigation function of providing a user with information about a route to a destination. The AVN terminal 100 may be also called a navigation terminal, or another name used in common by those skilled in the art.

The AVN terminal 100 may selectively display at least one of an audio screen, a video screen, and a navigation screen through a display unit 101, and also display various control screens related to the control of the vehicle 1 or screens related to additional functions that can be executed on the AVN terminal 100.

According to an embodiment, the AVN terminal 100 may interwork with the air conditioner described above to display various control screens related to the control of the air conditioner through the display unit 101. Also, the AVN terminal 100 may control the operation state of the air conditioner to adjust an air-conditioned environment inside the vehicle 1. Also, the AVN terminal 100 may display a map on which a route to a destination is represented through the display unit 101, although not limited to this.

Meanwhile, the display unit 101 may be positioned in a center fascia 11 which is the central area of a dashboard 10. According to an embodiment, the display unit 101 may be a Liquid Crystal Display (LCD), a Light Emitting Diode (LED) display, a Plasma Display Panel (PDP) display, an Organic Light Emitting Diode (OLED) display, or a Cathode Ray Tube (CRT) display, although not limited to these.

In the interior of the vehicle 1, a speaker 143 may be provided to output sound. Accordingly, the vehicle 1 may output sound required to perform an audio function, a video function, a navigation function, and other additional functions, through the speaker 143. For example, the vehicle 1 may provide a driver with information about a route to a destination, through the speaker 143, although not limited to this.

A navigation input unit 102 may be located in the center fascia 11 which is the central area of the dashboard 10. A driver may manipulate the navigation input unit 102 to input various control commands or information about a destination.

Meanwhile, the navigation input unit 102 may be located close to the display unit 101, and implemented as a hard key type. If the display unit 101 is implemented as a touch screen, the display unit 101 may perform the function of the navigation input unit 102, in addition to a display function.

Meanwhile, a center console 40 may include a center input unit 43 of a jog shuttle type or a hard key type. The center console 40 may be positioned between a driver seat 21 and a passenger seat 22, and include a gear transmission lever 41 and a tray 42. The center input unit 43 may perform all or a part of functions of the navigation input unit 102.

Referring to FIG. 3, the vehicle 1 may further include an input unit 110, a localization sensor 130, a speed sensor 140, a speech recognition module 150, a navigation module 160, an impact sensor 170, a vision sensor 180, and a speech input unit 188, in addition to the above-described components.

The speech recognition module 150 and the navigation module 160 may be integrated into at least one System On Chip (SOC) installed in the vehicle 1, and may be operated by a processor. However, if the vehicle 1 includes a plurality of SOCs, the speech recognition module 150 and the navigation module 160 may be integrated into the plurality of SOCs.

The input unit 110 may be implemented as the navigation input unit 102 and the center input unit 43. Also, the input unit 110 may be implemented as an input unit disposed in a side part of the steering wheel 12, although not limited to this. If the display unit 101 is implemented as a touch screen, the display unit 110 may perform the functions of the input unit 110.

The input unit 110 may receive various control commands from a driver or a passenger (hereinafter, the driver or the passenger will be referred to as a user). For example, the input unit 110 may receive a command for executing a speech recognition function, as well as commands for executing the functions of specific equipment in the vehicle 1, such as a music search command, a destination search command, etc.

Also, in the vehicle 1, the speech input unit 188 may be provided. The speech input unit 188 may receive a users voice command. For example, the speech input unit 188 may receive a voice command uttered from a driver through a microphone, and convert the voice command into an electrical signal.

According to an embodiment, the speech input unit 188 may be, as shown in FIG. 2, installed on a headlining 13. However, the speech input unit 188 may be installed on the dash board 10, on the steering wheel 12, or on any appropriate location at which a driving users speech can be effectively received.

Meanwhile, the vehicle 1 may include a communication unit 120. The communication unit 120 may transmit/receive data to/from an external device through a wired/wireless communication network. The wireless communication network enables a device to transmit/receive signals containing data to/from another device in a wireless fashion. For example, the wireless communication network may include a 3Generation (3G) communication network, a 4Generation (4G) communication network, and a Bluetooth communication network, although not limited to these.

Also, the wired communication network enables a device to transmit/receive signals containing data to/from another device in a wired fashion. For example, the wired communication network may include a Peripheral Component Interconnect (PCI), PCI-express, and a Universal Serial Bus (USB), although not limited to these.

For example, the communication unit 110 may receive various data corresponding to a users voice command from an external server. According to an embodiment, if a voice command related to today's weather is received from a user through the input unit 110, the communication unit 120 may receive data about today's weather from an external server through a wireless communication network.

The localization sensor 130 may acquire location information of the vehicle 1. The location information of the vehicle 1 may be information indicating the location of the vehicle 1. For example, the location information may include coordinate information, such as longitude, latitude, and altitude, although not limited to these. That is, the location information of the vehicle 1 may be any information indicating the location of the vehicle 1.

Meanwhile, the localization sensor 130 may be a Global Positioning System (GPS) that receives location information of an object from a satellite, or a Differential Global Positioning System (DGPS) that is an enhanced GPS for estimating the location of an object with great accuracy, although not limited to these.

Location information that is transmitted from a satellite to a GPS on the ground may have errors. For example, when there are N (N≥2) GPSs located close to each other, the N GPSs may have similar errors. In this case, the DGPS may cancel such errors of the N GPSs to thereby acquire more accurate data. Accordingly, the vehicle 1 may determine a distance to an obstacle, based on the location information of the vehicle 1 detected through the localization sensor 130 and location information of the obstacle stored in map database 161, which will be described in detail later.

The speed sensor 140 may detect a driving speed of the vehicle 1. Herein, the speed sensor 140 may be any one of various kinds of speed sensors including a reed switch type speed sensor, a photoelectric speed sensor, and an electronic speed sensor, although not limited to these.

The impact sensor 170, which may be implemented by an inertial sensor, may sense any impact applied to the vehicle 1. For example, when an impact greater than a predetermined strength is applied to the vehicle 1, the impact sensor 170 may output a signal. According to an embodiment, the impact sensor 170 may adjust the magnitude of a signal according to an impact strength to thereby provide information about impact quantity.

The vision sensor 180 may identify an object, such as an obstacle or another vehicle, existing around the vehicle 1 from a peripheral image of the vehicle 1, and also calculate a distance to the identified object. For example, the vision sensor 180 may identify an object existing ahead of the vehicle 1, and calculate a distance between the vehicle 1 and the identified object.

Meanwhile, referring to FIG. 3, the navigation module 160 may include the map database 161, and a navigation controller 162. The map database 161 may store map data. Herein, the map data may include various information, such as roads, buildings, etc., which can represent a map. Also, the map data may include information about Point of Interest (P01).

In addition, the map data may include environmental information about roads included in the map. The environmental information about roads means driving environment information of roads. Also, the environmental information about roads may include information about various facilities existing on or around roads, and information indicating areas where traffic accidents often took place. For example, the environmental information about roads may be information about obstacles existing on roads, such as information indicating the locations of speed humps, and information about unpaved roads.

Herein, the obstacle may be any object existing on a road, which may collide with a traveling vehicle to generate noise. A calculator 151 may calculate a time of arrival at an obstacle based on information about obstacles stored in the map database 161. This operation will be described in detail, later.

Meanwhile, the map database 161 may be at least one type of storage medium among a flash memory type, a hard disk type, a multimedia card micro type, card type memory (for example, Secure Digital (SD) or eXtreme Digital (XD) memory), Random Access Memory (RAM), Static Random Access Memory (SRAM), Read-Only Memory (ROM), Electrically Erasable Programmable Read-Only Memory (EEPROM), magnetic memory, a magnetic disk, and an optical disk. However, the map database 161 is not limited to the above-mentioned devices, and may be implemented as any other type of storage medium well-known to those skilled in the art.

The map database 161 may store map data of all regions or map data of predetermined regions. The vehicle 1 may receive necessary map data from an external server through the communication unit 120.

Meanwhile, the navigation controller 162 may control overall operations of the navigation module 160. For example, the navigation controller 162 may decide a route to a destination based on the map data stored in the map database 161, and control operations of various functions that are supported by the navigation module 160.

Meanwhile, referring to FIG. 3, the speech recognition module 150 may include the calculator 151 and a speech recognition controller 152. The calculator 151 and the speech recognition controller 152 may be integrated into a SOC installed in the vehicle 1, and operated by a processor.

The calculator 151 may calculate a time of arrival at an obstacle existing on a road on which the vehicle 1 travels. In order to calculate a time of arrival at an obstacle, the calculator 151 may calculate a distance to the obstacle from the vehicle 1, based on location information of the vehicle 1 and location information of the obstacle.

The location information of the vehicle 1 may be acquired through the localization sensor 130, as described above, and the location information of the obstacle may be acquired from the map database 161 installed in the navigation module 160. Accordingly, the calculator 151 may calculate a time in which the vehicle 1 is expected to arrive at the obstacle, that is, a time in which the vehicle 1 is expected to collide with the obstacle, based on the distance between the vehicle 1 and the obstacle and a driving speed of the vehicle 1 detected by the speed sensor 140.

The speech recognition controller 152 may control overall operations of the speech recognition module 150. For example, the speech recognition controller 152 may extract a speech waveform from a users voice command, and interwork with the communication unit 120 to transfer the speech waveform to a speech recognition server. Then, the speech recognition controller 152 may receive the result of speech recognition from the speech recognition server through the communication unit 120, and generate a control signal for controlling a specific device in the vehicle 1 based on the result of speech recognition.

Meanwhile, the speech recognition controller 152 may perform noise removal pre-processing in order to extract more accurate data from the users voice command. Meanwhile, noise may be classified into dynamic noise and static noise. The static noise is noise that is constantly generated when a vehicle travels. For example, the static noise may include noise generated by the sound of wind and noise generated by the driving of the engine when the vehicle travels. In contrast, the dynamic noise is noise generated temporarily. For example, the dynamic noise may include noise generated at a specific moment, such as noise generated when a traveling vehicle collides with an obstacle.

Since the static noise is constantly generated, the static noise may be constantly added to a voice command uttered by the user. However, since the dynamic noise is generated at a specific moment, the dynamic noise may or may not be generated when the user utters a voice command.

Accordingly, if no dynamic noise is generated, the dynamic noise removal pre-processing does not need to be performed. Accordingly, the vehicle 1 may predict generation of dynamic noise, and perform dynamic noise removal pre-processing only when generation of dynamic noise is predicted, thereby improving the accuracy of speech recognition while reducing overload according to a speech recognition process.

Meanwhile, the speech recognition controller 152 may compare a time in which a voice command input is expected to be completed to a time in which the vehicle 1 is expected to arrive at an obstacle to determine whether to perform dynamic noise removal pre-processing. For example, due to various obstacles existing on a road, an impact may be applied to the vehicle 1. If such an impact is applied to the vehicle 1 when the user inputs a voice command, it is difficult to accurately recognize the users voice command since dynamic noise is included in the voice command. Accordingly, the vehicle 1 may predict generation of dynamic noise, and activate a dynamic noise removal pre-processing function if generation of dynamic noise is predicted, thereby accurately recognizing a users voice command.

A time in which the voice command input is expected to be completed may be a time in which a user finishes utterance of a voice command on average. However, when a plurality of users utter the same content with their voices, they may finish their utterances at different times. Accordingly, the speech recognition controller 152 may set a time in which users finish utterances of a voice command on average to a voice command input completion time, in advance, and determine whether the vehicle 1 arrives at an obstacle and dynamic noise is generated due to collision with the obstacle before the voice command input completion time elapses. The voice command input completion time may be set automatically by a designer of the speech recognition module 150, or manually by a user.

Accordingly, if the speech recognition controller 152 determines that the vehicle 1 will arrive at an obstacle before the voice command input completion time elapses, the speech recognition controller 152 may determine that dynamic noise will be generated, and activate the dynamic noise removal pre-processing function. As another example, if the speech recognition controller 152 determines that the vehicle 1 will arrive at an obstacle after the voice command input completion time elapses, the speech recognition controller 152 may determine that no dynamic noise will be generated, and may not activate the dynamic noise removal pre-processing function.

However, the speed of the vehicle 1 may change, and a time in which an actual voice command input is completed may also change. Accordingly, the speech recognition controller 152 may determine whether an impact is applied to the vehicle 1 while an actual voice command is input to determine whether to perform dynamic noise removal pre-processing, thereby determining in stages whether or not to perform dynamic noise removal pre-processing.

That is, the speech recognition controller 152 may determine whether dynamic noise is included in a voice command to determine activation of the dynamic noise removal pre-processing function, and also, determine whether dynamic noise is generated while an actual voice command is input to determine whether to activate the dynamic noise removal pre-processing function.

Also, if the speech recognition controller 152 determines that the vehicle 1 will not arrive at any obstacle within the voice command input completion time, the speech recognition controller 152 may perform only static noise removal pre-processing. Also, there is a case that although the speech recognition controller 152 determines that the vehicle 1 will arrive at an obstacle within the voice command input completion time, no impact is sensed when an actual voice command is received, or the strength of a sensed impact is smaller than a predetermined strength so as for the speech recognition controller 152 to determine that the impact has no influence on recognition of the voice command. In this case, the speech recognition controller 152 may perform only static noise removal pre-processing, thereby preventing overload of a voice command recognition process, and quickly processing a voice command.

A controller 185 may be a processor for performing various operations and control processes, such as a processor installed in the AVN terminal 100, or may be one of various processors well-known in the related art.

Also, the controller 185 may control overall operations of the vehicle 1. More specifically, the controller 185 may control operations of all components (for example, the display unit 101 and the speaker 143) installed in the vehicle 1, as well as various modules such as the speech recognition module 150 and the navigation module 160 installed in the AVN terminal 100. The controller 185 may generate control signals for controlling the components of the vehicle 1 to control the operations of the individual components.

For example, the controller 185 may control the communication unit 120 to update the map database 161. According to an embodiment, when map data needs to be updated due to a reason such as new road building, the controller 185 may access a wireless communication network through the communication unit 120 to receive data from an external server, and update the map database 161. Thereby, the vehicle 1 can more accurately determine information about locations of obstacles.

Figure 4:
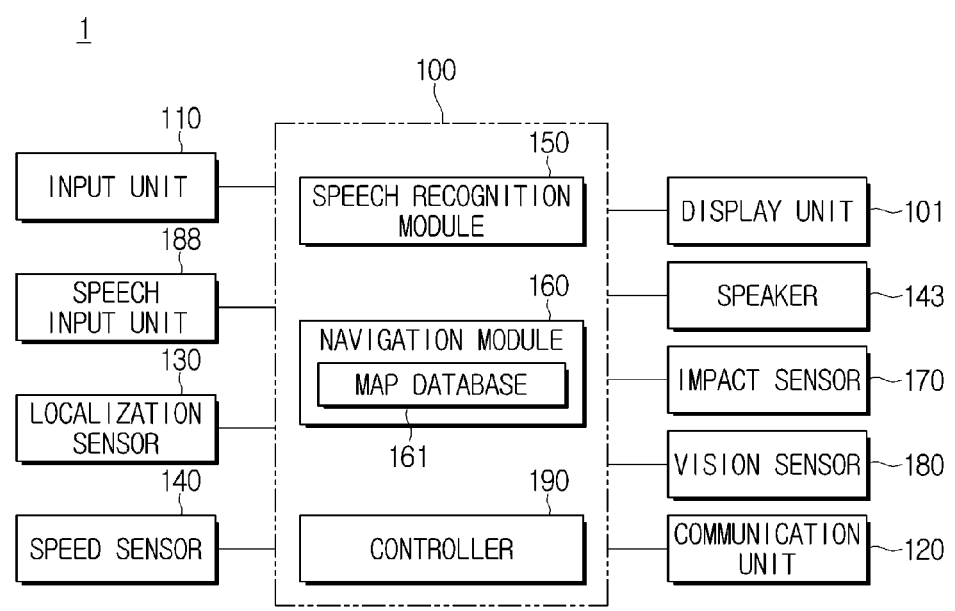

Meanwhile, referring to FIG. 4, the AVN terminal 100 may include the speech recognition module 150, the navigation module 160, and a controller 190. The speech recognition module 150, the navigation module 160, and the controller 190 may be integrated into a SOC installed in the AVN terminal 100.

The controller 190 may control overall operations of the speech recognition module 150 and the navigation module 160, while controlling overall operations of devices in the vehicle 1. That is, the controller 190 may include the controller 185, the speech recognition controller 152, and the navigation controller 162 shown in FIG. 3, and accordingly, a detailed description for the controller 190 will be omitted.

According to an embodiment, the calculator 151, the speech recognition controller 152, and the navigation controller 162 may be integrated into a SOC installed in the AVN terminal 100. That is, the controller 190 may be installed in the AVN terminal 100 to perform overall operations of the above-described components.

Hereinafter, operation flow of a vehicle will be briefly described.

Figure 5:
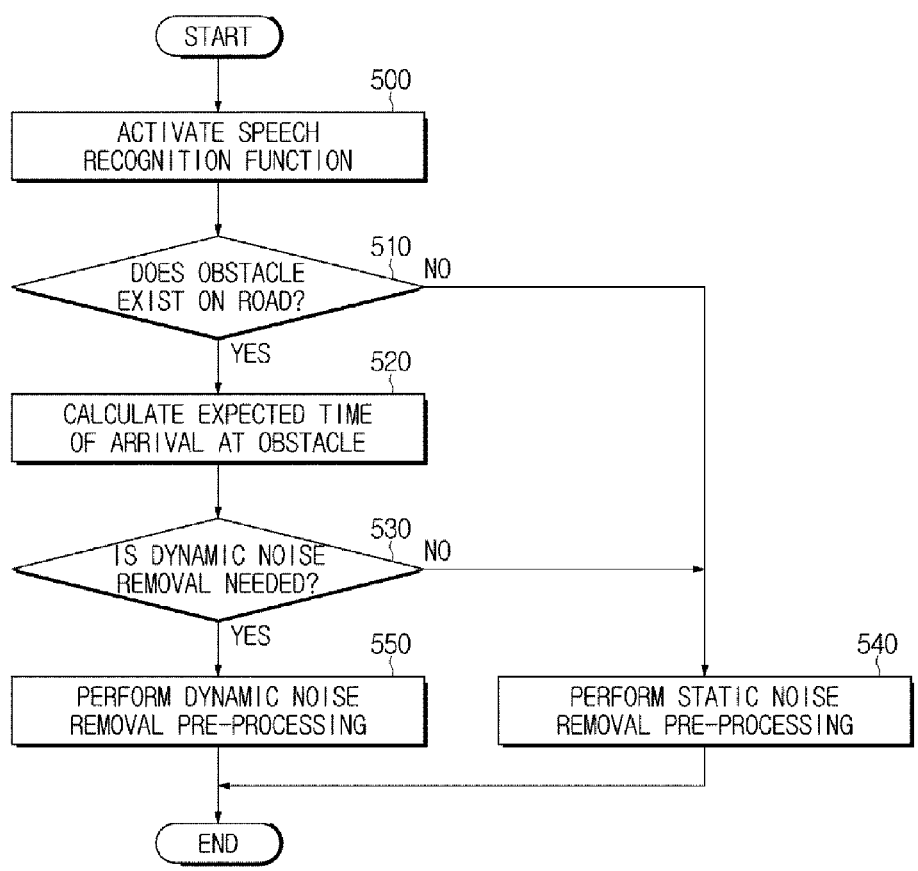
FIG. 5 is a flowchart illustrating a method in which a vehicle activates a dynamic noise removal function according to an expected time of arrival at an obstacle, according to an embodiment of the present disclosure.
Figure 6:
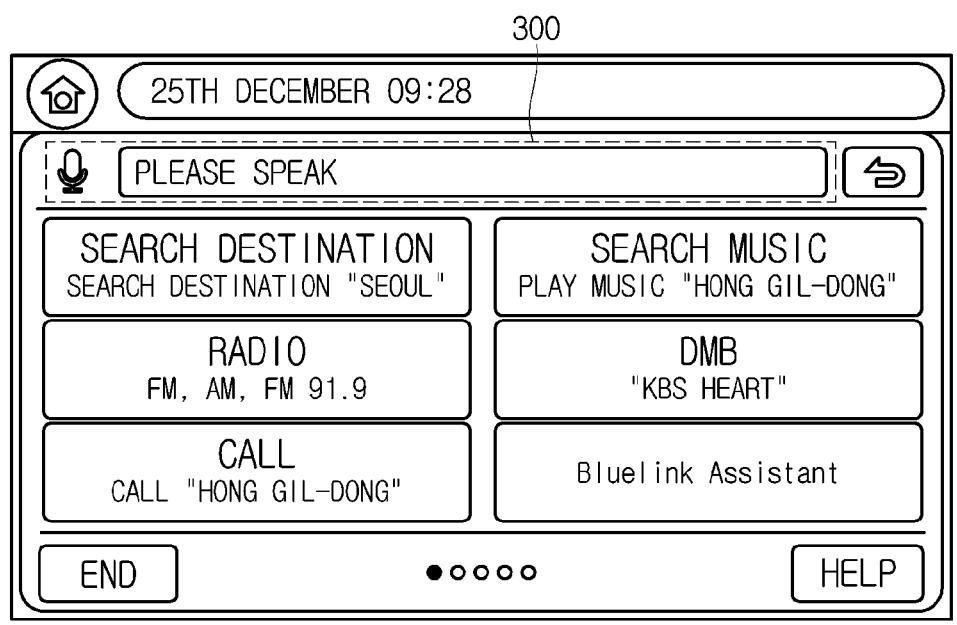
FIG. 6 is a view for describing a method of supporting a speech recognition function through a display screen, according to an embodiment of the present disclosure.
Figure 7:
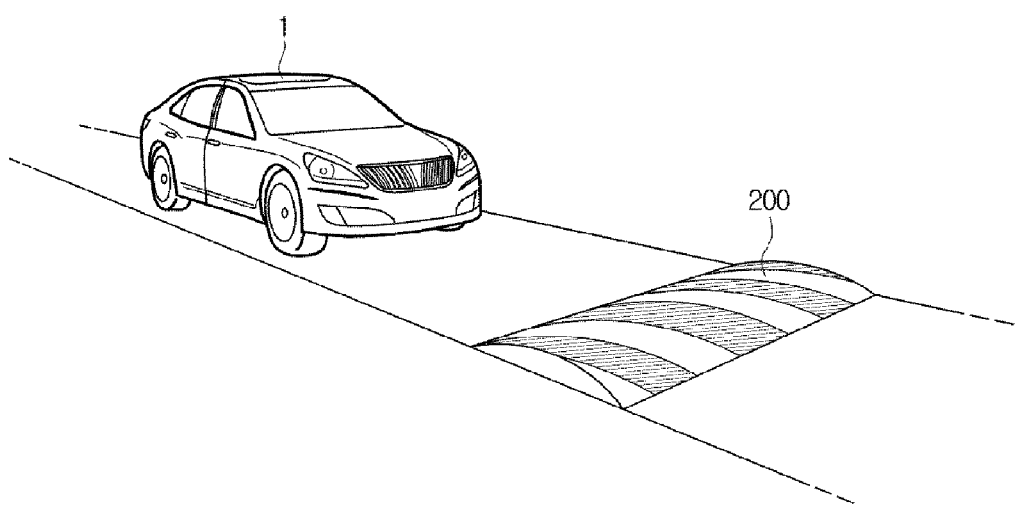
FIGS. 7 and 8 show a vehicle traveling on a road, and an obstacle located on a driving path of the vehicle.
Figure 8:
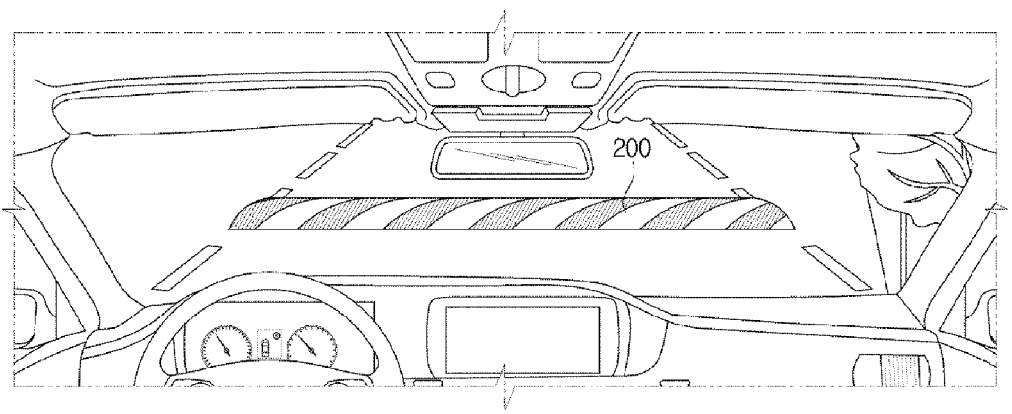

FIG. 5 is a flowchart illustrating a flowchart in which a vehicle activates a dynamic noise removal function according to an expected time of arrival at an obstacle, according to an embodiment of the present disclosure, FIG. 6 is a view for describing a flowchart of supporting a speech recognition function through a display screen, according to an embodiment of the present disclosure, and FIGS. 7 and 8 show a vehicle traveling on a road, and an obstacle located on a driving path of the vehicle. The following description will be given with reference to FIGS. 5 to 8.

Referring to FIG. 5, a vehicle may activate a speech recognition function, in operation 500. The vehicle may receive a command for activating a speech recognition module through any one of devices capable of receiving various control commands from a user. Accordingly, the vehicle may activate the speech recognition module to convert into a standby state for receiving a users voice command.

If the speech recognition module is activated, the vehicle may request a user to input a voice command. For example, as shown in FIG. 6, the vehicle may display a pop-up message 300 on a display screen to request a user to input a voice command. Also, the vehicle may output beep sound through a speaker to request a user to input a voice command.

The vehicle may determine whether an obstacle exists on a road on which the vehicle travels, in operation 510. The obstacle may be any obstacle existing on a road. For example, the obstacle may be a speed hump 200 on a road, as shown in FIG. 7. That is, the obstacle may be any obstacle that may collide with a traveling vehicle to generate noise.

The vehicle may determine existence of an obstacle based on road environment information stored in map database, or sense any obstacle ahead through a vision sensor to determine existence of an obstacle.

If the vehicle determines that an obstacle exists, the vehicle may calculate an expected time of arrival at the obstacle, in operation 520. According to an embodiment, the vehicle may acquire its own location information through a localization sensor, and calculate a distance to the obstacle, based on the acquired location information and information about the obstacle stored in the map database. Also, the vehicle may detect a driving speed through a speed sensor. Accordingly, the vehicle may calculate a time of arrival at the obstacle, based on the driving speed and the distance to the obstacle.

As another example, the vehicle may calculate a distance to a sensed obstacle through the vision sensor. Referring to FIG. 7, the vehicle may detect a speed hump 200 existing in a front view, and calculate a distance to the speed hump 200, through the vision sensor. Accordingly, the vehicle may calculate an expected time of arrival at the obstacle, based on a driving speed detected through the speed sensor and the distance to the obstacle calculated through the vision sensor.

The vehicle may compare the expected time of arrival at the obstacle to a time in which a voice command input is completed on average to determine whether dynamic noise removal is needed, in operation 530. For example, if a voice command input is completed before the vehicle arrives at the obstacle, no dynamic noise due to an impact may be generated until the voice command input is completed. In this case, the vehicle does not need to remove dynamic noise. However, if the vehicle arrives at the obstacle before a voice command input is completed, dynamic noise may be added to the voice command. In this case, the vehicle may remove dynamic noise added to the received voice command to thereby raise the accuracy of speech recognition. That is, the vehicle may predict whether or not dynamic noise will be added to a voice command to determine whether or not to remove dynamic noise, thereby improving the accuracy of speech recognition.

Meanwhile, the driving speed of the vehicle and the driving environments of roads may change every moment. For example, the road environment information stored in the map database may change due to road construction and the like. Accordingly, no obstacle may exist on a road on which the vehicle travels.

As another example, if a voice command input is completed earlier than a time in which a voice command input is completed on average, the result of prediction about whether or not the vehicle will collide with an obstacle while a voice command is input may not reflect a real situation.

For this reason, the vehicle according to the current embodiment may determine whether the vehicle collides with an obstacle, that is, whether the vehicle arrives at an obstacle, within a time in which an actual voice command input is completed, through an impact sensor, thereby preventing other non-dynamic noise from being removed to make recognition of a voice command difficult.

Accordingly, if no obstacle exists on a road on which the vehicle travels, or if the vehicle collides with an obstacle after an actual voice command input is completed, contrary to expectations, the vehicle may perform only static noise removal pre-processing, in operation 540. Also, if the vehicle collides with an obstacle before an actual voice command input is completed, the vehicle may perform dynamic noise removal pre-processing, thereby improving the accuracy of speech recognition, in operation 550.

Figure 9:
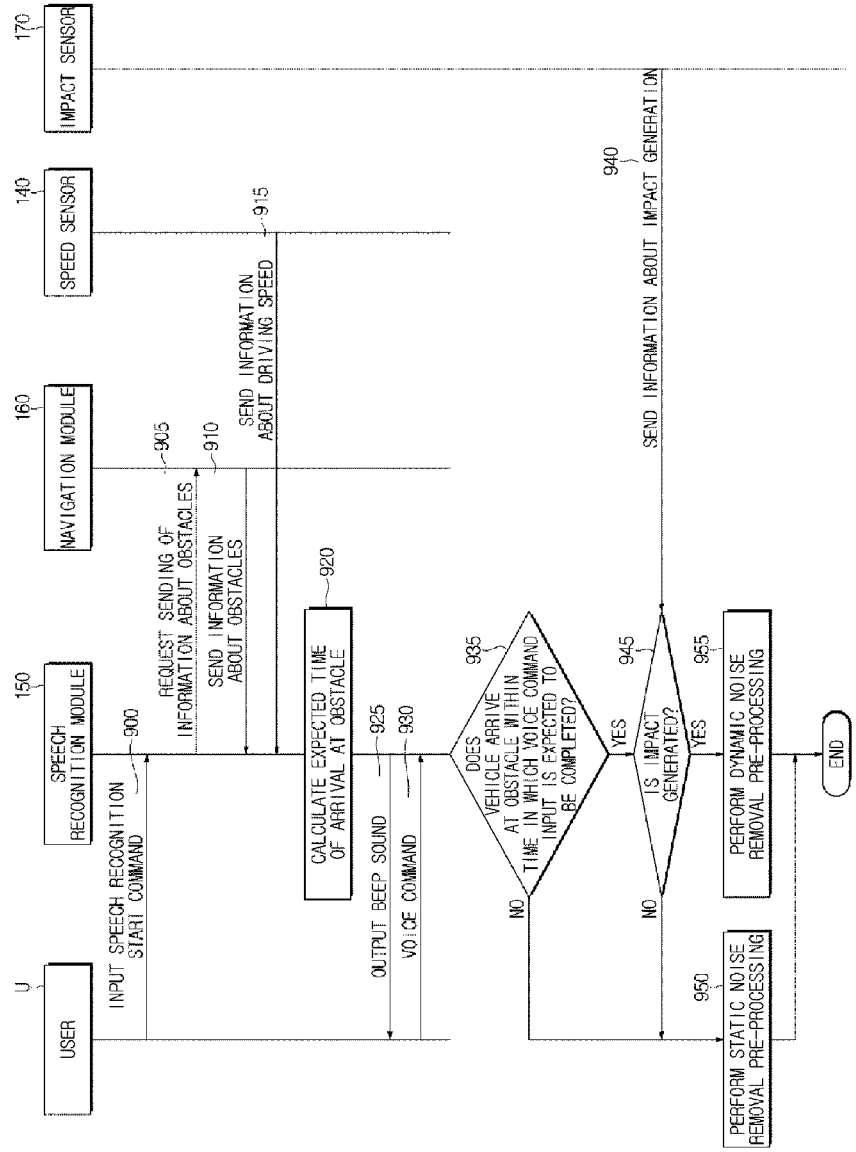
FIGS. 9 and 10 are flowcharts illustrating methods in which a user interfaces with components in a vehicle to perform noise removal pre-processing, according to embodiments of the present disclosure.
Figure 10:
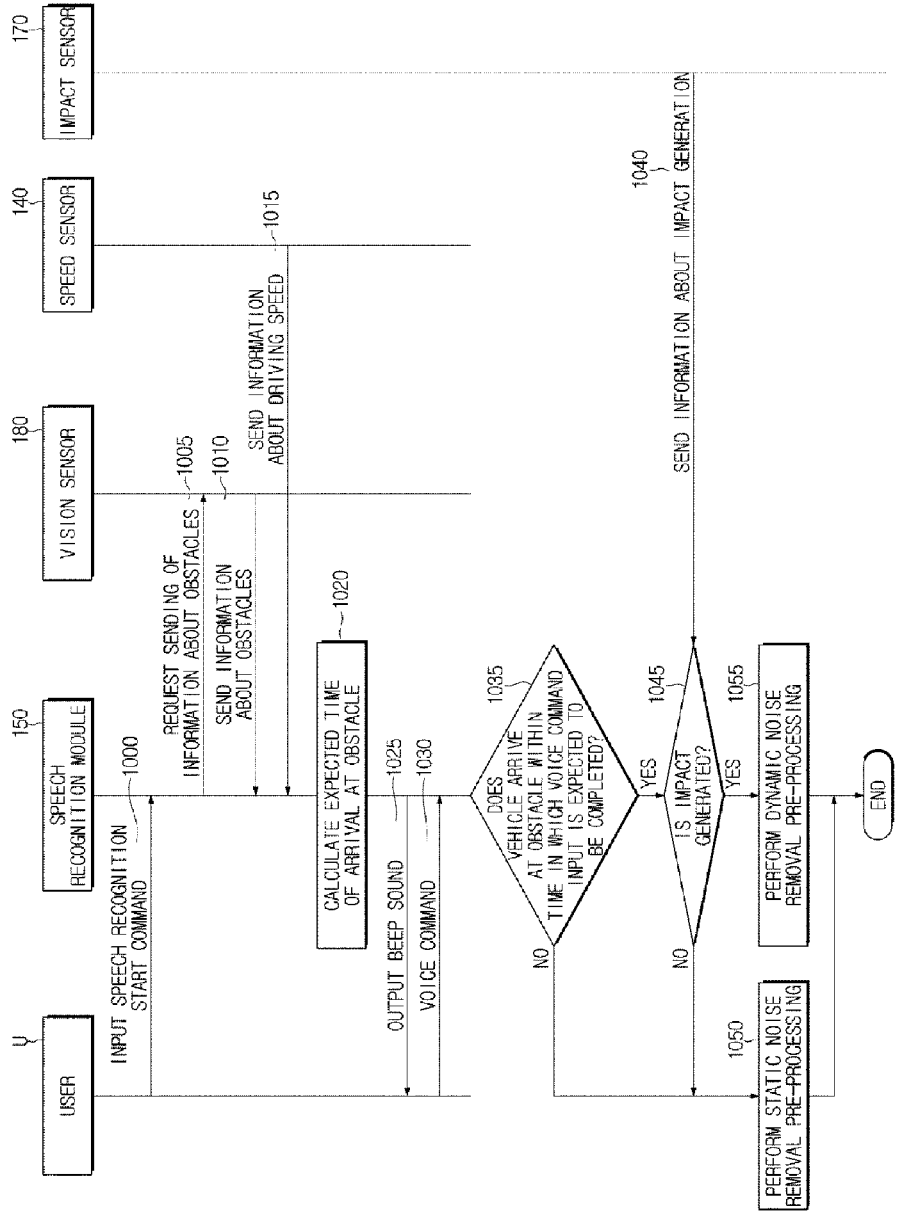

FIGS. 9 and 10 are flowcharts illustrating methods in which a user interfaces with components in a vehicle to perform noise removal pre-processing, according to embodiments of the present disclosure. The following description will be given with reference to FIGS. 9 and 10.

Hereinafter, the operation of the speech recognition module 150 and the operation of the navigation module 160 (see FIG. 4) will be separately described. However, the operations of the speech recognition module 150 and the navigation module 160 may be performed by the controller 190 (see FIG. 4) installed in the AVN terminal, as described above.

Referring to FIG. 9, a user U may input a speech recognition start command using one of various components in a vehicle, in operation 900. For example, the user U may input a speech recognition start command through a navigation input unit or an input unit provided on one side of a steering wheel, during driving.

The speech recognition module 150 may receive the speech recognition start command, and request the navigation module 160 to send information about obstacles, in operation 905. The information about obstacles may include information about kinds and locations of obstacles. Meanwhile, the speech recognition module 150 may receive information about a current location of the vehicle, detected through a localization sensor.

Accordingly, the speech recognition module 150 may receive the information about obstacles, in operation 910, to calculate a distance to an obstacle ahead of the vehicle based on the information about the locations of obstacles and the information about the current location of the vehicle. Also, the speech recognition module 150 may receive information about a driving speed detected through the speed sensor 140, in operation 915.

Then, the speech recognition module 150 may calculate a time of arrival at the obstacle, based on the distance to the obstacle and the driving speed, in operation 920. Also, the speech recognition module 150 may compare the time of arrival at the obstacle to a time in which a voice command input is completed, and thus determine whether the vehicle collides with the obstacle when the user inputs a voice command. The speech recognition module 150 may determine whether to activate a dynamic noise removal pre-processing function, based on the result of the determination.

According to an embodiment, the speech recognition module 150 may determine whether the vehicle collides with the obstacle when the user inputs the voice command, using Equation (1) below.

$$T<D/V<T+S \qquad (1)$$

Herein, T represents an average time taken for a user to start uttering, and S represents an average time for which a user inputs a voice command. Also, V represents a driving speed of the vehicle, and D represents a distance to an obstacle from the fore end of the vehicle.

For example, noise removal may be required when a voice command received from a user includes noise. Accordingly, when a user inputs no voice command, noise does not have influence on recognizing a user's voice commands. Accordingly, the speech recognition module 150 may determine whether noise is generated due to collision with an obstacle for an average time in which a user inputs a voice command, to thus determine whether to perform noise removal pre-processing.

Meanwhile, the speech recognition module 150 may output beep sound through a speaker to request the user U to input a voice command, in operation 925. Then, the vehicle may receive a voice command uttered from the user U, through a speech input unit, in operation 930. Meanwhile, the speech recognition module 150 may determine whether the vehicle arrives at an obstacle within a time in which the voice command input is expected to be completed, in operation 935.

If the speech recognition module 150 determines that the vehicle will arrive at the obstacle within the time in which the voice command input is expected to be completed, the speech recognition module 150 may determine whether an impact is generated while an actual voice command is input. At this time, the speech recognition module 150 may receive information about impact generation from the impact sensor 170, in operation 940, to determine whether an impact is generated, in operation 945.

Accordingly, if no impact is generated within a time in which an actual voice command input is completed although the vehicle is expected to arrive at the obstacle within the expected time, the speech recognition module 150 may perform only static noise removal pre-processing, in operation 950. In contrast, if the vehicle is expected to arrive at the obstacle within the expected time, and an impact is generated within a time in which an actual voice command input is completed, the speech recognition module 150 may perform dynamic noise removal pre-processing, in operation 955. For example, the speech recognition module 150 may determine whether dynamic noise is generated while an actual voice command is input, based on Equation (2) below.

$$B<G<E \qquad (2)$$

Herein, B represents a time at which it is determined that a voice command input starts. For example, the speech recognition module 150 may determine a time at which beep sound is output as a time at which a voice command input starts. The user U may utter voice when a predetermined time elapses after beep sound is output. Accordingly, the speech recognition module 150 may determine that a voice command input starts when a predetermined time elapses after beep sound is output.

E represents a time at which it is determined that a sound command input is completed. For example, the speech recognition module 150 may determine that a voice command input is completed when a voice waveform which is a major portion of an input voice waveform is no longer input. Or, the speech recognition module 150 may determine that a voice command input is completed when a predetermined voice command input time has elapsed.

G represents a time at which an impact that is greater than or equal to a predetermined strength is sensed through an impact sensor. That is, the speech recognition module 150 may determine whether to activate the dynamic noise removal pre-processing function depending on whether an impact is generated within a time in which an actual voice command is input.

Meanwhile, operations of FIG. 10 are the same as those of FIG. 9, except that the speech recognition module 150 receives information about an obstacle from the vision sensor 180 (see FIGS. 3 and 4), instead of the navigation module 160. Therefore, a description of operations 1000 through 1055 in FIG. 10 is omitted to avoid redundancy. As described above, the vision sensor 180 may be installed in the vehicle to sense any obstacle from a front view of the vehicle, as shown in FIG. 8. Accordingly, the speech recognition module 150 may receive information about a distance to an obstacle from the vision sensor 180.

The method according to the above-described embodiment can be embodied in the form of program instructions, which can be performed through various computer means, and can be written in computer-readable recording medium. The computer-readable recording medium can include program instructions, data files, data structures, and the combination thereof. The program instructions stored in the storage medium can be designed and configured specifically for an exemplary embodiment or can be publically known and available to those who are skilled in the field of computer software. Examples of the computer-readable recording medium can include magnetic media, such as a hard disk, a floppy disk, and a magnetic tape, optical media, such as CD-ROM and DVD, magneto-optical media, such as a floptical disk, and hardware devices, such as ROM, RAM and flash memory, which are specifically configured to store and run program instructions.

Examples of program instructions include both machine code, such as produced by a compiler, and high-level language code that may be executed on the computer using an interpreter. The hardware devices may be configured to act as one or more software modules in order to perform the operations of the above-described embodiments, or vice versa.

Although embodiments have been described by specific examples and drawings, it will be understood to those of ordinary skill in the art that various adjustments and modifications are possible from the above description. For example, although the described techniques are performed in a different order, and/or the described system, architecture, device, or circuit component are coupled or combined in a different form or substituted/replaced with another component or equivalent, suitable results can be achieved.

Therefore, other implementations, other embodiments, and things equivalent to claims are within the scope of the claims to be described below.

What is claimed is:

1. A vehicle comprising:
an input unit configured to receive an execution command for speech recognition;
a calculator configured to calculate a time in which the vehicle is expected to arrive at an obstacle existing on a road on which the vehicle travels; and
a speech recognition controller configured to compare the calculated time in which the vehicle is expected to arrive at the obstacle to a time in which a voice command input is expected to be completed to determine whether to perform dynamic noise removal pre-processing.

2. The vehicle according to claim 1, further comprising a speed sensor configured to detect a driving speed of the vehicle, and to provide information about the driving speed of the vehicle.

3. The vehicle according to claim 2, wherein the calculator calculates the time in which the vehicle is expected to arrive at the obstacle existing on the road on which the vehicle travels, based on information about the obstacle existing on the road on which the vehicle travels, received from a navigation module, and information about the driving speed of the vehicle, received from the speed sensor.

4. The vehicle according to claim 2, wherein the calculator calculates the time in which the vehicle is expected to arrive at the obstacle existing on the road on which the vehicle travels, based on the information about the obstacle existing on the road on which the vehicle travels, sensed through a vision sensor, and information about the driving speed of the vehicle, received from the speed sensor.

5. The vehicle according to claim 1, wherein the speech recognition controller compares the calculated time in which the vehicle is expected to arrive at the obstacle to the time in which the voice command input is expected to be completed, and activates the dynamic noise removal pre-processing, if the speech recognition controller determines that the vehicle arrives at the obstacle before the voice command input is expected to be completed elapses.

6. The vehicle according to claim 1, further comprising an impact sensor configured to determine whether an impact is generated due to the obstacle existing on the road on which the vehicle travels.

7. The vehicle according to claim 6, wherein if the speech recognition controller determines that the vehicle arrives at the obstacle within the time in which the voice command input is expected to be completed, the speech recognition controller determines whether an impact is generated due to the obstacle, through the impact sensor, and determines whether to activate the dynamic noise removal pre-processing based on the result of the determination.

8. A method of controlling a vehicle, comprising:
activating speech recognition upon receiving an execution command to start speech recognition;
calculating a time in which the vehicle is expected to arrive at an obstacle existing on a road on which the vehicle travels; and
comparing the calculated time in which the vehicle is expected to arrive at the obstacle to a time in which a voice command input is expected to be completed to determine whether to perform dynamic noise removal pre-processing.

9. The method according to claim 8, wherein the calculating of the time in which the vehicle is expected to arrive at the obstacle existing on the road on which the vehicle travels comprises calculating the time in which the vehicle is expected to arrive at the obstacle existing on the road on which the vehicle travels, based on information about the obstacle existing on the road on which the vehicle travels, received from a navigation module, and information about a driving speed of the vehicle, received from a speed sensor.

10. The method according to claim 8, wherein the calculating of the time in which the vehicle is expected to arrive at the obstacle existing on the road on which the vehicle travels comprises calculating the time in which the vehicle is expected to arrive at the obstacle existing on the road on which the vehicle travels, based on information about the obstacle existing on the road on which the vehicle travels, sensed through a vision sensor, and information about a driving speed of the vehicle, received from the speed sensor.

11. The method according to claim 8, wherein the determining of whether to perform dynamic noise removal pre-processing comprises:
upon determination that the calculated time in which the vehicle is expected to arrive at the obstacle is within the time in which the voice command input is expected to be completed, activating the dynamic noise removal pre-process; and
upon determination that the calculated time in which the vehicle is expected to arrive at the obstacle is greater than the time in which the voice command input is expected to be completed, performing a static noise removal pre-process without activating the dynamic noise removal pre-process.

12. The method according to claim 8, wherein the determining of whether to perform dynamic noise removal pre-processing comprises:
upon determination that the vehicle arrives at the obstacle within the time in which the voice command input is expected to be completed, determining whether an impact is generated due to the obstacle, through an impact sensor;
upon determination that the impact is generated due to the obstacle, activating the dynamic noise removal pre-processing; and
upon determination that the impact is not generated due to the obstacle, performing a static noise removal pre-processing without activating the dynamic noise removal pre-processing.

* * * * *